United States Patent [19]
Nakanishi et al.

[11] Patent Number: 5,549,855
[45] Date of Patent: Aug. 27, 1996

[54] OPTICAL ELEMENT MOLDING METHOD

[75] Inventors: Hiroshi Nakanishi; Norihisa Saito, both of Tokyo; Toshinori Ando, Inagi; Hisakazu Morinaga, Yamato, all of Japan

[73] Assignee: Canon Kabushiki Kaisha, Tokyo, Japan

[21] Appl. No.: 260,969

[22] Filed: Jun. 15, 1994

[30] Foreign Application Priority Data

Jun. 18, 1993 [JP] Japan .................................. 5-147721
May 10, 1994 [JP] Japan .................................. 6-096386

[51] Int. Cl.$^6$ .................................................. B29D 11/00
[52] U.S. Cl. ........................ 264/2.5; 264/2.1; 264/40.1; 364/577; 364/475.02; 425/808
[58] Field of Search ...................... 264/2.5, 2.1, 40.1, 264/40.7; 364/473, 577, 474.31; 425/808

[56] References Cited

U.S. PATENT DOCUMENTS

| 5,198,161 | 3/1993 | Ogura et al. | 264/40.7 |
| 5,296,179 | 3/1994 | Kamiguchi et al. | 264/40.1 |
| 5,329,406 | 7/1994 | Nakanishi et al. | 359/811 |
| 5,397,514 | 3/1995 | Breil et al. | 264/40.1 |

FOREIGN PATENT DOCUMENTS 5-96572   4/1993   Japan .

OTHER PUBLICATIONS

Patent Abstracts of Japan, vol. 17, No. 433 (M–1461) (6062), Aug. 11, 1993 (5–96572, Apr. 20, 1993).

*Primary Examiner*—Mathieu D. Vargot
*Attorney, Agent, or Firm*—Fitzpatrick, Cella, Harper & Scinto

[57] ABSTRACT

It is an object of this invention to provide an optical element molding method capable of correcting local processing errors in an optical element without increasing the size of an apparatus or raising the manufacturing cost. To achieve this object, an optical element molding method includes the first step of setting molding conditions before molding of said optical element, such that a constant shape error is stably formed on an optical function surface of the optical element, the second step of dividing the optical function surface of the optical element to be molded under the molding conditions into a plurality of regions, and approximating the shape error by using a function so that the divided regions are continuous in the boundaries between the regions, the third step of processing the shape of the cavity surface of the optical-insert member into a shape by which the constant shape error is canceled, on the basis of the function obtained in the second step, and the fourth step of molding the optical element by using the optical insert member processed in the third step.

3 Claims, 14 Drawing Sheets

FIG. 8

| RANGE OF Y | j | Yj | hj0 | hj1 | hj2 | hj3 | hj4 |
|---|---|---|---|---|---|---|---|
| -55.000 ~ -45.000 | 1 | -55.000 | 5.00E-02 | 0.00E+00 | -3.14E-04 | 3.88E-06 | 0.00E+00 |
| ~ -41.862 | 2 | -45.000 | 2.25E-02 | -5.12E-03 | 4.82E-04 | 8.87E-05 | -1.89E-05 |
| ~ -41.139 | 3 | -41.826 | 1.21E-02 | -1.80E-03 | 2.03E-04 | -1.48E-04 | 4.69E-05 |
| ~ -38.774 | 4 | -41.139 | 1.08E-02 | -1.67E-03 | 2.88E-05 | -1.24E-05 | 3.04E-06 |
| ~ -33.943 | 5 | -38.774 | 6.98E-03 | -1.58E-03 | 4.27E-05 | 1.64E-05 | -1.35E-06 |
| ~ -33.307 | 6 | -33.943 | 1.44E-03 | -6.31E-04 | 9.13E-05 | -9.64E-06 | 2.36E-06 |
| ~ -25.000 | 7 | -33.307 | 1.08E-03 | -5.25E-04 | 7.86E-05 | -3.65E-06 | -1.17E-08 |
| ~ +25.000 | 8 | -25.000 | 0.00E-00 | 0.00E+00 | 0.00E+00 | 0.00E+00 | 0.00E+00 |
| ~ +28.337 | 9 | +25.000 | 0.00E+00 | 0.00E+00 | -1.14E-05 | 3.37E-06 | -2.41E-07 |
| ~ +29.539 | 10 | +28.337 | -3.19E-05 | 4.62E-07 | 6.17E-06 | 1.45E-07 | 9.20E-07 |
| ~ +34.487 | 11 | +29.539 | -2.02E-05 | 2.23E-05 | 1.47E-05 | 4.57E-06 | -4.43E-07 |
| ~ +37.522 | 12 | +34.487 | 7.38E-04 | 2.89E-04 | 1.75E-05 | -4.20E-06 | -1.55E-07 |
| ~ +39.886 | 13 | +37.522 | 1.65E-03 | 2.62E-04 | -2.93E-05 | -6.08E-06 | 4.17E-06 |
| ~ +43.000 | 14 | +39.886 | 2.15E-03 | 2.41E-04 | 6.73E-05 | 3.33E-05 | 6.14E-05 |
| ~ +45.000 | 15 | +43.000 | 1.03E-02 | 9.04E-03 | -6.79E-04 | 1.65E-05 | 0.00E+00 |

OPTICAL ELEMENT MOLDING METHOD

BACKGROUND OF THE INVENTION

The present invention relates to an optical element molded from a plastic material by using an optical insert member, a method of molding this optical element, and a laser scanning optical system using the optical element. Recently, optical elements such as lenses are manufactured by using plastic materials, because aspherical shapes can be obtained easily and plastic materials are light in weight. In addition, most optical elements consisting of plastic materials are manufactured by injection molding or molding methods, such as injection compression molding, classified into the category of injection molding. The consequent mass-productivity leads to the advantage that these optical elements are inexpensive compared to those made from glass. Conventionally, such an optical element consisting of a plastic material is generally molded by using an optical insert member 10, as shown in FIG. 1 and having a surface shape which is the exact reverse of a lens surface shape optically designed. This optical insert member 10 is constituted by optical inserts 12 and 13 forming a cavity 24, and an optical insert set 11. Surfaces 14 and 15 of the optical inserts are finished into mirror surfaces.

A molten resin is injected from a gate 21 into the cavity 24 defined by the optical inserts 12 and 13, and a sufficiently high pressure is applied. Consequently, the surface shapes of the optical inserts 12 and 13 are transferred as the optical function surfaces of an optical element as the molded product.

Molding an optical element consisting of plastics as described above, however, introduces the problem that the surface shape accuracy of the resulting optical element reduced due to the shrinkage upon molding of the plastic material.

Assuming that a lens is molded by using plastics as a material, for example, the molded lens is smaller than the cavity 24 formed by the optical inserts 12 and 13. In addition, the optical function surfaces deform from the surfaces of the optical inserts due to the molding shrinkage.

More specifically, in the case of a lens shown in FIG. 2, this deformation is caused by shape errors in the direction of thickness and in the direction of the generatrix (longitudinal direction), and by the resulting generatrix inclination, curvature error, and radius error in the direction of the directrix (lateral direction). If these errors fall outside the range of design tolerances, this molded product cannot be used as a final product.

If, however, the displacement from the surfaces of the optical inserts occurring during molding is stable and does not vary largely independent of the molding date and the molding environment, it is only necessary to correct this error in advance by the shape of the surfaces 14 and 15 of the optical insert. Consequently, the shape of the molded product can fall within the range of design tolerances, and so the molded product can be used as a final product.

Several methods are known as the method of forming an optical insert by taking into account the shrinkage or the deformation taking place during molding. In the case of lenses whose required accuracy is low, an optical insert is processed as follows. That is, if an optical function surface with R=20 is necessary, the radius of curvature of the surface of the optical insert is multiplied by an amount of molding shrinkage (in this case, 1.003 to 1.006), as 20×1.003=20.06 to 20×1.006=20.12, assuming that the molding shrinkage is an even shrinkage symmetrical about the optical axis.

In the case of lenses whose required accuracy is relatively high, on the other hand, the difference in shape of the optical function surface of a molded lens from the surface shape of an optical insert, i.e., the shrinkage deformation caused by molding is approximated by a polynomial of degrees two, four, six, . . . , and the coefficients of the degrees two, four, six, . . . of this polynomial are subtracted from the coefficients of the degrees two, four, six, . . . of a polynomial which represents the initial desired optical design shape, thereby making a polynomial representing a new surface shape. An optical insert is remanufactured on the basis of this polynomial.

In either of the above conventional methods, however, the entire lens surface is approximated by one molding shrinkage factor symmetrical about the optical axis or by one polynomial. As a result, the following problems arise.

1. In molding particularly an elongated lens or a large-diameter lens, the degree by which a resin is cooled by an optical insert in a portion closer to a gate, as a resin injection port, is different from that in a portion farther from the gate. That is, the viscosity of a resin flowing to the portion closer to the gate is low since the resin is not cooled very much, while the viscosity of a resin flowing to the portion farther from the gate is high since the resin is cooled well. Consequently, the shrinkage factor of the resin in the portion closer to the gate is different from that in the portion farther from the gate; the shrinkage factor in the portion farther from the gate is larger. The result is that the surface shape of an optical insert is not satisfactorily transferred to the resin in the portion farther from the gate, leading to degradation in surface accuracy.

2. To increase the surface accuracy in the portion farther from the gate, on the other hand, a high pressure must be applied. Consequently, when the optical insert set is opened, release deformation is caused by an increase in elastic deformation or in release resistance resulting from the over packing of a resin. This degrades the surface accuracy in the portion closer to the gate.

3. Furthermore, in molding of an optical element having a complicated shape, a partial surface defect (=degradation of the surface accuracy) occurs due to uneven cooling and shrinkage on the optical surface. This makes it difficult to obtain a uniform surface accuracy.

In molding of plastic optical elements, it is impossible to form the gate in a portion of an optical axis 36 (a portion along the central line of a lens) since the optical axis is necessary as an effective portion. That is, as illustrated in FIG. 2, the gate is positioned at one end of a lens. In many instances, therefore, no shrinkage deformation symmetrical about the optical axis 36 (central line) takes place under the influence of the flow of a resin. However, there is no conventional means of processing an optical insert by taking these local shrinkage and deformation into consideration. That is, there is no means of correcting the local shrinkage and deformation of an optical element by using the optical insert.

Conventionally, therefore, the following special molding methods are used or the molding conditions are improved in order to minimize the shrinkage deformation from the surface shape of an optical insert and to obtain an even shape free from a habit.

1. A so-called injection compression molding method is used in which a pressure is not applied into a cavity from a single gate, but compression is performed by the entire optical insert.

2. A resin is injected with the mold temperature of the optical insert set raised to be higher than the glass transition point of the resin, and then cooled to extract the molded product.

Either of the above two methods, however, requires a large-scale apparatus or is unsuitable for mass-production because the molding cycle is long. In either case, the manufacturing cost is increased. In addition, even if the above special methods are used, it is not necessarily possible to obtain a desired uniform shape accuracy throughout the entire optical function surface depending on the shape or the like of an optical element. Also, even if polynomial approximation is possible, the degree of the polynomial increases to cause large oscillations around both the ends of data, or to make the data susceptible to errors in arithmetic operations performed by a computer. All these factors make it difficult to increase the accuracy of plastic optical elements.

SUMMARY OF THE INVENTION

The present invention has been made in consideration of the above situations and has as its main object to provide a molding method capable of molding a high-accuracy optical element whose local processing errors are corrected.

It is another object of the present invention to provide a molding method capable of molding a high-accuracy optical element whose local processing errors are corrected without increasing the size of an apparatus or raising the manufacturing cost.

It is still another object of the present invention to provide a high-accuracy optical element whose local processing errors are corrected.

It is still another object of the present invention to provide a laser scanning optical system using a high-accuracy optical element whose local processing errors are corrected.

To solve the above conventional problems and to achieve the objects of the present invention, an optical element molding method according to the present invention is characterized by the following arrangement.

That is, there is provided an optical element molding method of molding a material of an optical element by using an optical insert member, thereby transferring a shape of a surface, as an optical function surface, of a cavity surface of the optical insert member onto a surface of the material, comprising the first step of setting molding conditions before molding of the optical element, such that a constant shape error is stably formed on an optical function surface of the optical element, the second step of dividing the optical function surface of the optical element to be molded under the molding conditions into a plurality of regions, and approximating the shape error by using a function so that the divided regions are continuous in boundaries between the regions, the third step of processing the shape of the cavity surface of the optical insert member into a shape by which the constant shape error is canceled, on the basis of the function obtained in the second step, and the fourth step of molding the optical element by using the optical insert member processed in the third step.

An optical element according to the present invention is molded by the above optical element molding method.

A laser scanning optical system according to the present invention uses the above optical element.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the Scope of the invention.

BRIEF DESCRIPTION OF THE DRAWINGS

FIG. 8 is a table showing the approximate coefficients of a spline function;

DETAILED DESCRIPTION OF THE PREFERRED EMBODIMENTS

Figure 2:
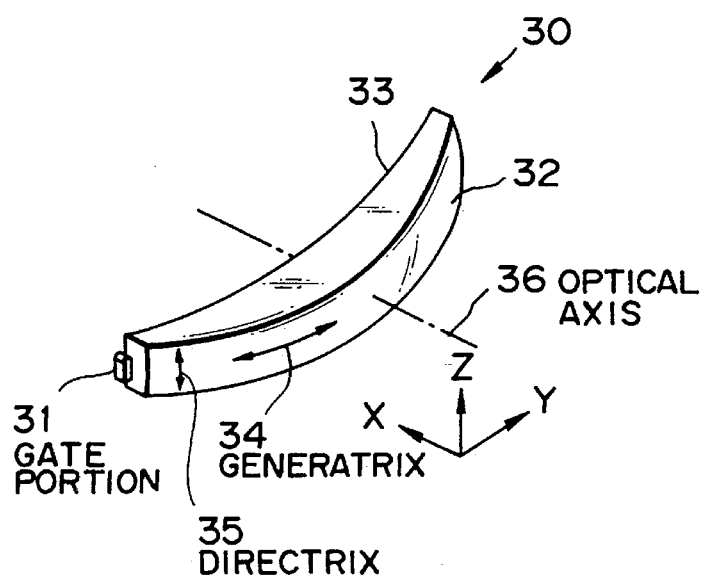
FIG. 2 is a perspective view showing the shape of an elongated lens to which the optical element molding method of this embodiment is applied.
Figure 3:
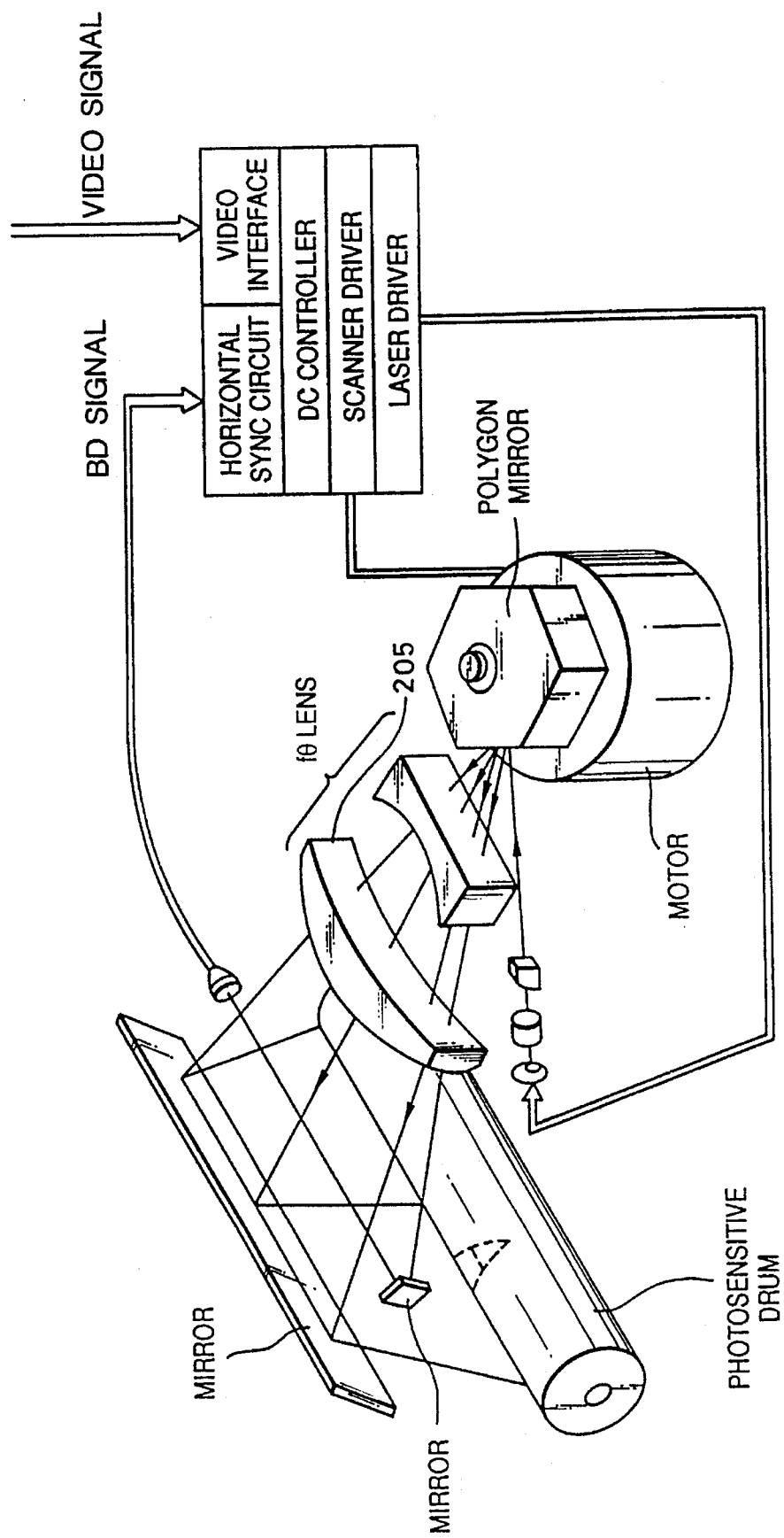
FIG. 3 is a perspective view showing the arrangement of a laser scanning optical system mounting the elongated lens of this embodiment.

The preferred embodiments of the present invention will be described in detail below with reference to the accompanying drawings by taking an elongated lens as shown in FIG. 2 as an example. This lens is to be incorporated into a laser scanning optical system such as an LBP (Laser Beam Printer) illustrated in FIG. 3, and corresponds to a lens denoted by reference numeral 205 in FIG. 3.
(1st Embodiment)

Figure 1:
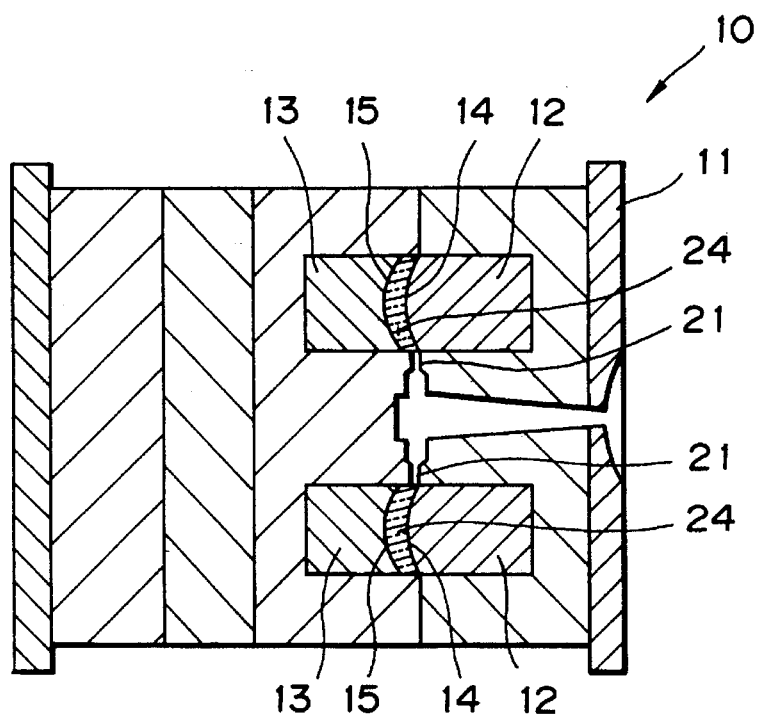
FIG. 1 is a view showing the overall arrangement of an optical insert.

Referring to FIG. 2, an elongated lens 30 is generally constituted by a gate portion 31 as a resin injection port, a convex lens surface 32, and a concave lens surface 33. Assume that in the lens surfaces 32 and 33, a longitudinal direction 34 is called the generatrix, and a lateral direction 35 is called the directrix. An optical insert set for use in the manufacture of the lens as illustrated in FIG. 2 is the one as shown in FIG. 1. Referring to FIG. 1, the optical insert surface 14 of the optical insert 12 corresponds to the lens surface 32 in FIG. 2, and the optical insert surface 15 of the optical insert 13 corresponds to the lens surface 33 in FIG. 2.

Figure 4A:
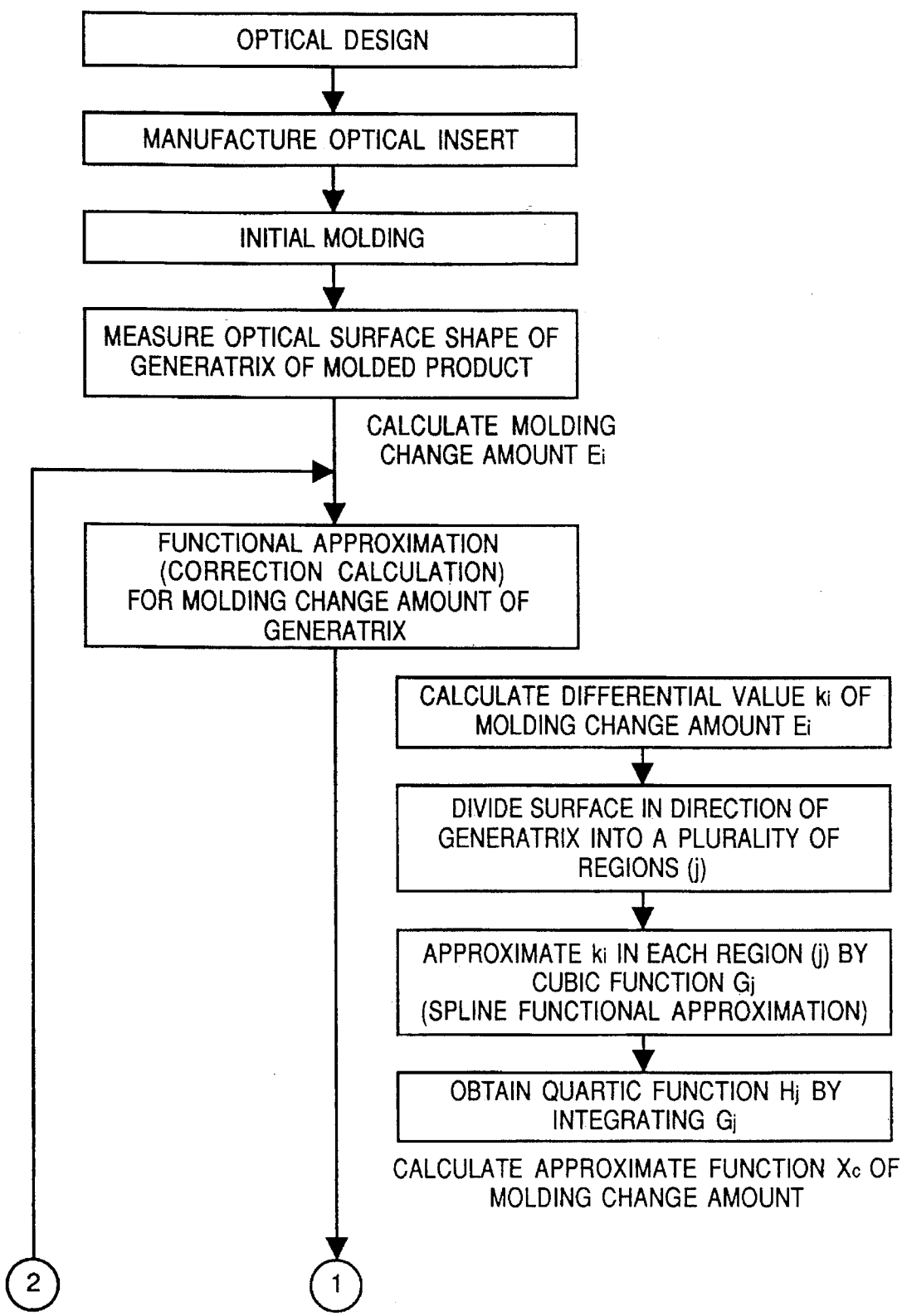
FIGS. 4A and 4B are flow charts for explaining the procedure of the optical element molding method according to the present invention.
Figure 4B:
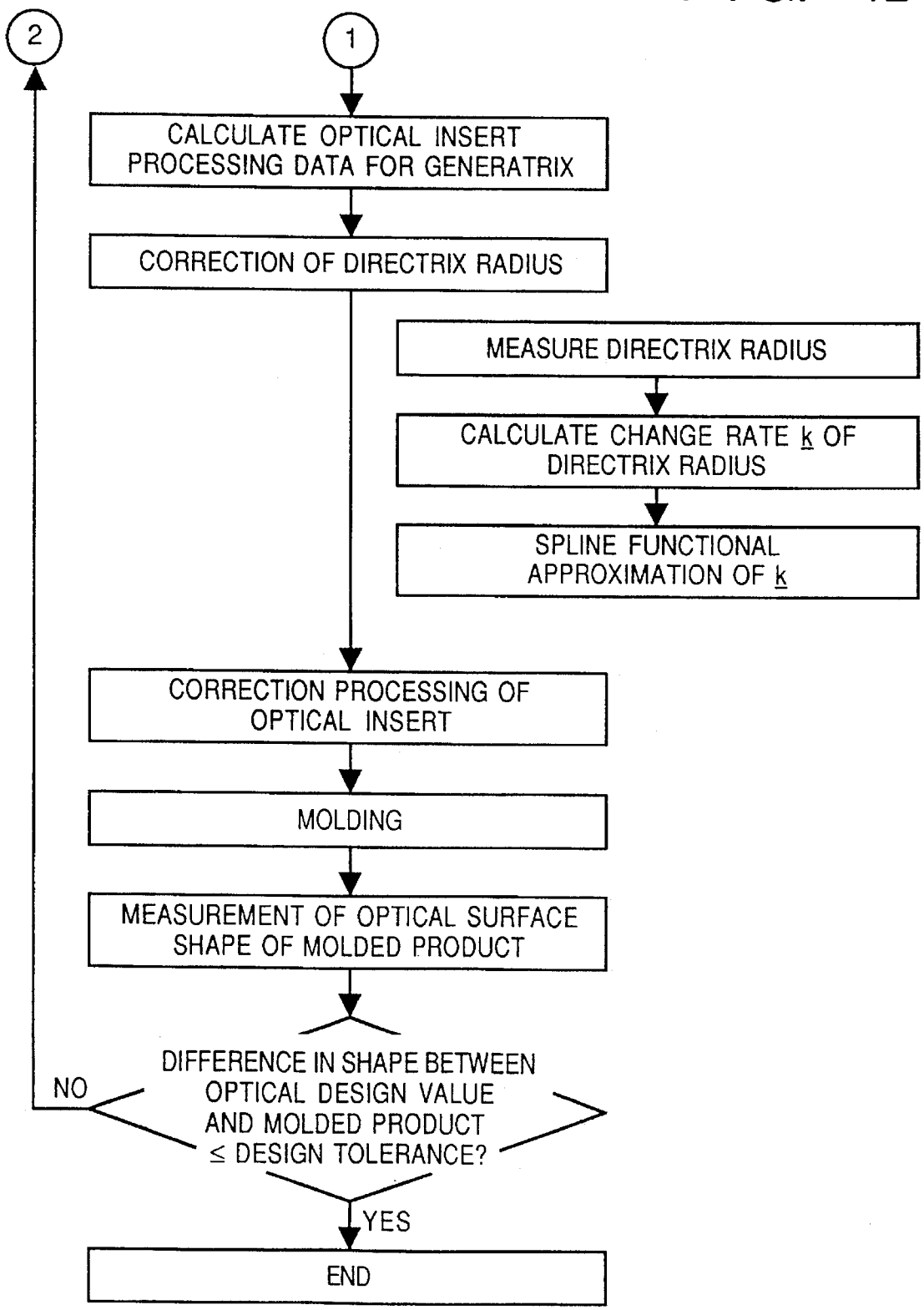

FIGS. 4A and 4B are flow charts showing a method of molding the optical element 30 in FIG. 2. The procedure of molding this optical element will be described in detail below with reference to FIGS. 4A and 4B.

Note that an acrylic (PMMA) resin is used as a plastic material in this embodiment.

(1) Optical design

The lens illustrated in FIG. 2 is a so-called toric lens in which the radius of curvature in a section along the generatrix direction (longitudinal direction) is different from that in a section along the directrix direction (lateral direction). This lens shape is generally used in particularly a laser scanning optical system.

In toric lenses using plastics, the shape in the generatrix direction is in many cases an aspherical shape for an aberration correction purpose. In this case, the shape is commonly expressed by using the following equation:

$$X=\{Y^2/R\}/[1+\{1-(Y/R)^2\}^{1/2}]+B2\ Y^2+B4Y^4+B6Y^6+\ldots$$

Note that the sectional shape in the directrix direction is a common circular arc, and the radius of this circular arc is termed a directrix radius.

(2) Manufacture of optical insert

Figure 5:
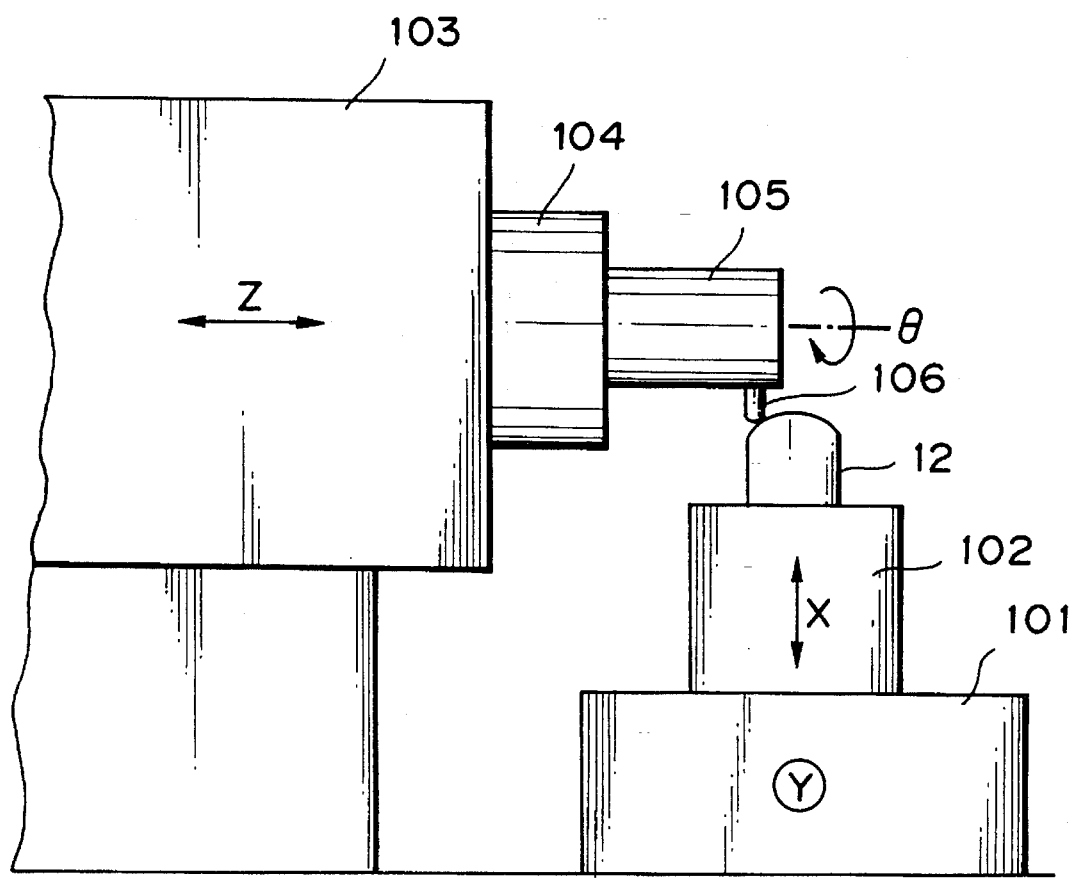
FIG. 5 is a schematic view showing a method of processing An optical insert for the elongated lens.

To begin with, processing point ordinates were calculated from the above approximate expression by taking the shape of a processing tool into consideration, thereby forming processing data. This processing tool is a diamond cutter whose point assumes a given R shape. The contact point of the point R of the cutter changes in accordance with a change in the shape of a material to be processed, so "by taking the shape of a processing tool into consideration" means that this change in the shape is taken into account. Thereafter, as shown in FIG. 5, in a machine tool having a triaxial table (with an axis Y into the paper, a horizontal axis Z, and a vertical axis X) and a uniaxial main spindle (rotating in a direction 8), a diamond cutter 106 was attached to a tool holder 105 mounted on the end of a main spindle 104 such that the tip of the blade of the diamond cutter 106 pointed outward. The diamond cutter 106 attached in this way was then rotated to perform processing. In addition, all the resultant surfaces were evenly polished in order to improve the surface roughness. In this manner, an optical insert that conformed to an optical design shape was manufactured. As the material of this optical insert, a steel product, such as SKD61, plated with phosphorus-containing nickel was used.

(3) Initial molding

It is important to find out molding conditions under which it is unnecessary to pay attention to errors of the shape of the optical surface of a molded product from the shape of an optical insert or to the distribution of the errors, unlike in conventional methods, and under which variations in the surface accuracy of the molded optical surface are small enough to realize a high reproducibility. For this purpose, it is necessary to obtain central conditions under which changes in the surface accuracy are small even if any of the temperature of a cylinder for melting a resin, the temperature of an optical insert, and the injection pressure varies to a certain extent. Since such molding conditions change in accordance with the shape of a molded product or the type of a resin material, the elongated lens as illustrated in FIG. 2 was processed under the following conditions in this embodiment.

<Molding conditions>

Cylinder temperature: 250° C.

Temperature of optical insert: 95° C. (the temperature of the optical insert was not forcedly changed.)

Injection pressure: 140 MPa

Molding cycle: 130 seconds

The dimensions of the lens were a central (maximum) thickness of 6 mm, a peripheral (minimum) thickness of 3 mm, and a length of 90 mm.

(4) Measurement of optical surface shape of generatrix of molded product

Figure 6:
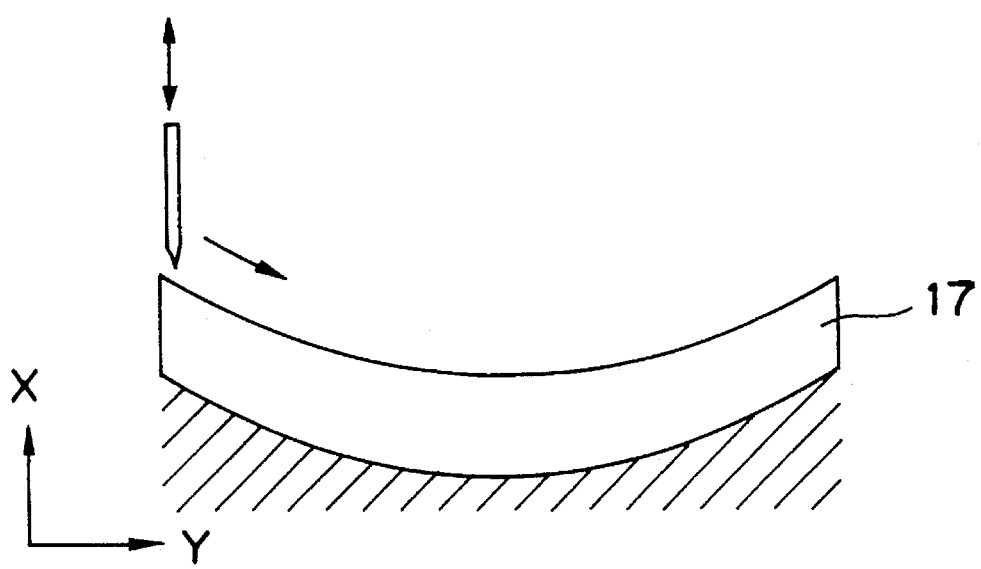
FIG. 6 is a view showing a method of measuring the surface shapes of a molded optical element and of an optical insert member.

In the step of measuring the optical surface shape of the molded product, one line (in the generatrix direction) connecting the central points of directrices 35 was measured by using a shape measuring device (e.g., "Form Talysurf" manufactured by Rank Taylor Hobson Co.) as shown in FIG. 6, and a molding change amount ($E_i$) from the optical design shape was calculated.

The details of the measurement were as follows.

Note that in the following description, the Y, Z, and X axes are coordinate axes in the directions along the generatrix, along the directrix, and along the optical axis, respectively (see FIG. 2).

The shape of the molded product was measured by the above shape measurement and input to a computer. The measurement must be done at a pitch fine enough to express the surface shape. In this embodiment, the specification is to ensure the curvature in a given 2-mm width in the direction along the generatrix. From this viewpoint, the pitch of measured data in the direction along the generatrix was set to about 100 μm so that approximately 20 points of measured data were present in the width of 2 mm.

The data obtained in this manner will be termed raw data ($u_i$, $O_i$).

$O_i$ has n data from $O_1$ to $O_n$ (n is the total number) as its elements, and each element represents a molded product surface shape (X coordinate value) measured by the shape measuring device. $u_i$ represents the position (Y coordinate value) of each measured value in the direction along the generatrix.

(Setting correction)

The surface shape measured raw data ($u_i$, $O_i$) contains setting errors of the lens during the measurement, such as a lateral shift in the direction (Y-axis direction) along the generatrix and a rotation about the Z axis, in addition to the molding deformation amount from the shape of the optical insert. Therefore, these setting errors must be corrected before the molding deformation amount from the shape of the optical insert is calculated.

In this embodiment, the measured data was subjected to a rotation θ about the Z axis and a parallel shift S in the Y-axis direction so that the square sum of the errors from the design shape was minimized.

Data ($Y_i$, $P_i$) Calculated by performing the direction rotation and the shift S for the measured data are:

$$Y_i = u_i \cdot \cos\theta = O_i \cdot \sin\theta - S$$

$$P_i = O_i \cdot \cos\theta + u_i \cdot \sin\theta$$

Assuming that the design shape is x=f(y), the square sum of the errors of $P_i$ from the design value is given by:

$$e = \sum_{i=1}^{n} (f(y_i) - p_i)^2$$

A sum total e of the square errors is calculated by using a computer while the values of θ and S are changed, thereby obtaining θ and S by which e is minimized. The data $(y_i, P_i)$ when the minimum value is obtained is used as molded product shape data whose setting errors are corrected.

(5) Calculation of molding change amount of generatrix

A molding change amount can be calculated by obtaining the difference between the measured data $(y_i, P_i)$ subjected to the setting error correction and design value data $(y_i, f(y_i))$. Assuming that the measured value of the molding change amount is $(y_i, E_i)$, $$E_i = P_i - f(y_i)$$

where i=1 to n.

Figure 7:
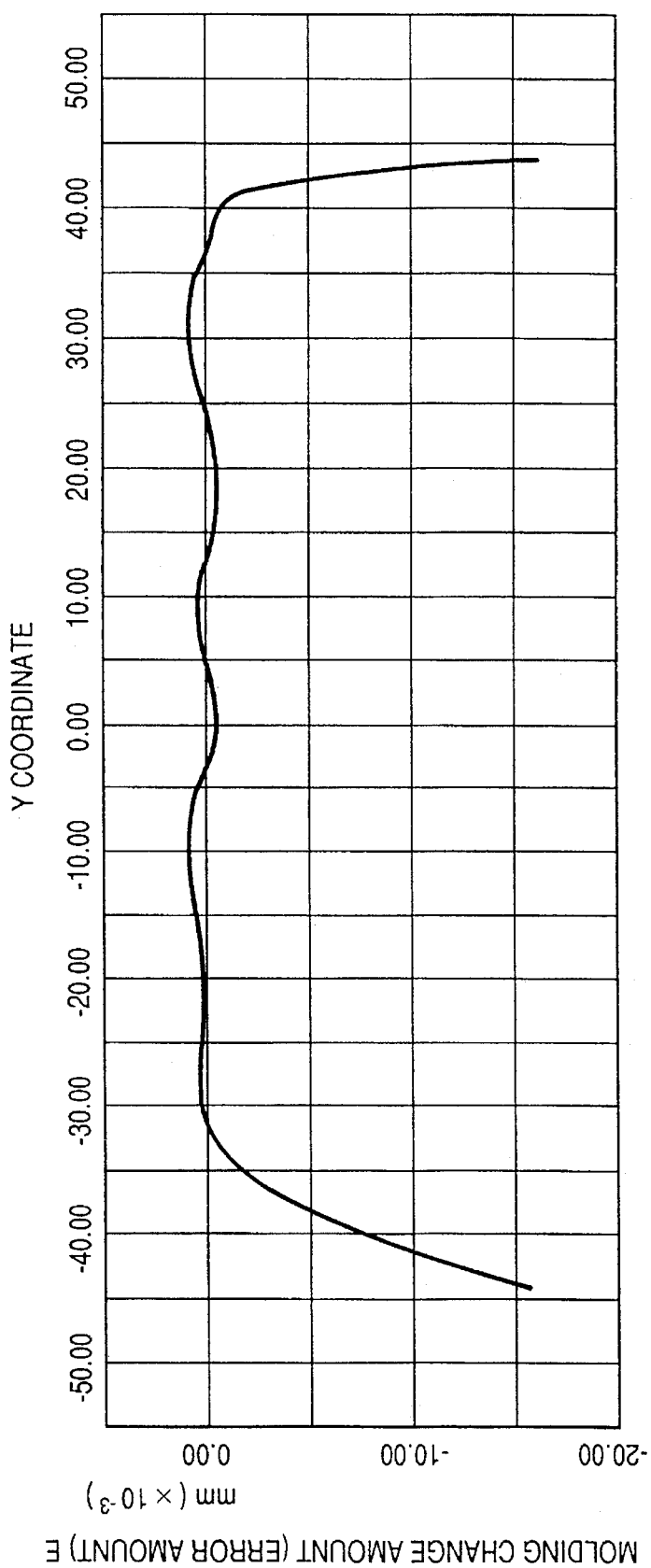
FIG. 7 is a graph showing the error amount of the optical surface shape of a molded product from the design shape after initial molding.

A graph shown in FIG. 7 shows the measurement result of the concave optical surface 33 of the lens in FIG. 2. In FIG. 7, a portion to the right of the Y axis indicates a portion near the gate 31 of the molded product illustrated in FIG. 2. Both the measured values in the portion near the gate 31 and the values measured in a portion away from the gate were largely different from the optical design value. The consequent molding change amount was asymmetrical about the optical axis (central axis).

The foregoing revealed the change amount on the surface caused by the molding. That is, the molded product shifts from the shape of the optical insert by $E_i$ at each position $y_i$ in the generatrix direction.

It is therefore possible to make the shape of a molded product agree with the design value by forming the optical insert such that the shape of the optical insert is shifted by $-E_i$ from the design value.

Generally, however, a data interval required in optical insert processing is smaller than the interval of $E_i$ obtained by the measurement, and each $E_i$ contains noise components during the measurement. Therefore, $E_i$ cannot be used directly in shape correction of the optical insert. For this reason, $E_i$ is interpolated and smoothed to obtain a function representing the molding change amount at a given position.

(6) Functional approximation (correction calculation) for molding change amount of generatrix In a functional approximation for the data string $(y_i, E_i)$, the most general approach is to use a polynomial approximation as discussed earlier. However, in situations where the data string has a complicated shape or it is necessary to improve an approximation accuracy, if the entire data string is expressed by one polynomial, the degree of the polynomial increases. Consequently, large oscillations occur near both the ends of the data, or the data is readily influenced by errors in arithmetic operations performed by a computer. In addition, it is impossible to perform correction in limited regions, such as partial surface defect (=degradation of the surface accuracy) around the generatrix or partial projections and recesses.

To solve the above problem, this embodiment employs a method (spline functional approximation) in which the optical surface in the direction of the generatrix is divided into a plurality of regions, and a molding change is approximated in each region by using a polynomial of a relatively low degree.

In this method, an (m)th-order approximate function is obtained in each of the plurality of regions, and in the boundary between each two adjacent regions, the derivations up to an (m-1)th order of the respective functions in the regions sandwiching the boundary are made equal to each other. Normally, cubic functions are used as the functions, and the values, the slopes (linear differential coefficients), and the curvatures (linear and quadratic differential coefficients) of these functions are made equal to each other in these boundaries. In addition, the width of each region and each coefficient of the cubic function in each region are optimized so that the square sum of the functional values and the errors of the data string is minimized.

On the surface of an optical element such as the one in this embodiment, however, it is important that the curvatures be smoothly continuous as well as the positions and the slopes. In the cubic functional approximation as discussed above, the change in curvature is bent in the boundary between the regions to form a polygonal line. This makes it impossible to obtain a smooth, continuous change in optical characteristics.

For this reason, it is desirable to use a function of degree four or higher as the approximate function in each region. In this embodiment, therefore, a differential value $k_i$ is first calculated from the molding change amount $(y_i, E_i)$ and approximated by the cubic spline function described above. The resulting approximate value is then integrated to finally obtain an approximate function represented by a quartic function in each region.

The differential value $k_i$ of the molding change amount at the position $y_i$ is calculated by the following equation:

$$k_i = (E_{i+1} - E_i)/(y_{i+1} - y_i)$$

where i=1 to n−1.

The differential value data string $(y_i, k_i)$ of the slope calculated by the above equation is then approximated by the cubic spline function discussed above. The outcome of the spline approximation is a cubic functional approximation of the differential value of the molding change amount. Therefore, by integrating this spline approximation result into a quartic function, a molding change amount approximate function which is smoothly continuous up to a quadratic differential coefficient can be obtained in the entire area.

If the spline functional approximation of the differential value of the molding change amount in a certain region j is given by the following cubic function:

$$G_j(d) = g_{j3} \cdot d^3 + g_{j2} \cdot d^2 + g_{j1} \cdot d + g_{j0}$$

where d is the distance from the start end of the region j, the change amount approximate function obtained by integrating this is as follows:

$$H_j(d) = h_{j4} \cdot d^4 + h_{j3} \cdot d^3 + h_{j2} \cdot d^2 + h_{j1} \cdot d + h_{j0}$$

where $h_{j4} = g_{j3}/4$, $h_{j3} = g_{j2}/3$, $h_{j2} = g_{j1}/2$, and $h_{j1} = g_{j0}$.

It is only necessary to select $h_{j0}$ so that the functional values in two adjacent regions agree with each other in the boundary between the regions.

In this embodiment, ±2 μm is assumed as a design tolerance. In FIG. 7, therefore, the correction is performed over the range of Y≦−25 mm and Y≧25 mm within which the molding change amount is large. In addition, as shown in FIG. 8, the entire generatrix is divided into 15 regions to determine the coefficients of the spline function, and an approximate function $X_c(Y)$ for the molding change amount is defined by the following equation:

$$X_c(Y) = H_j(Y) = \sum_{i=0}^{4} [h_{ji} \times (Y - Y_j)^i]$$

where j=1 to 15.

Figure 9:
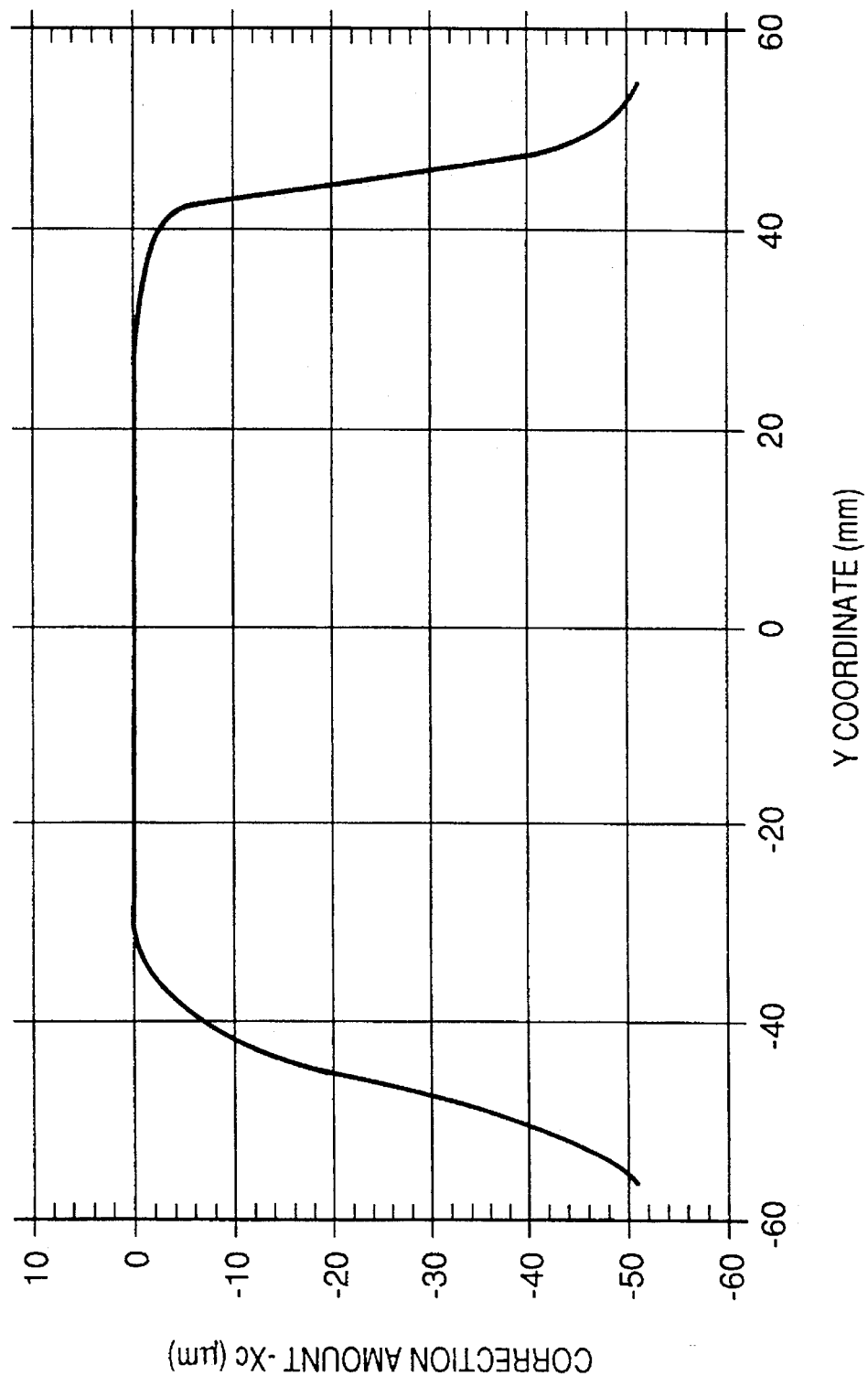
FIG. 9 is a graph showing the correction amount of An optical insert.

FIG. 9 shows the corrected shape of the optical surface approximated and defined by the above equation.

(7) Calculation of optical insert processing data of generatrix

Shape data of the optical insert containing the correction of the molding change amount is formed by using the change amount approximate function obtained by the methods discussed so far.

Figure 10:
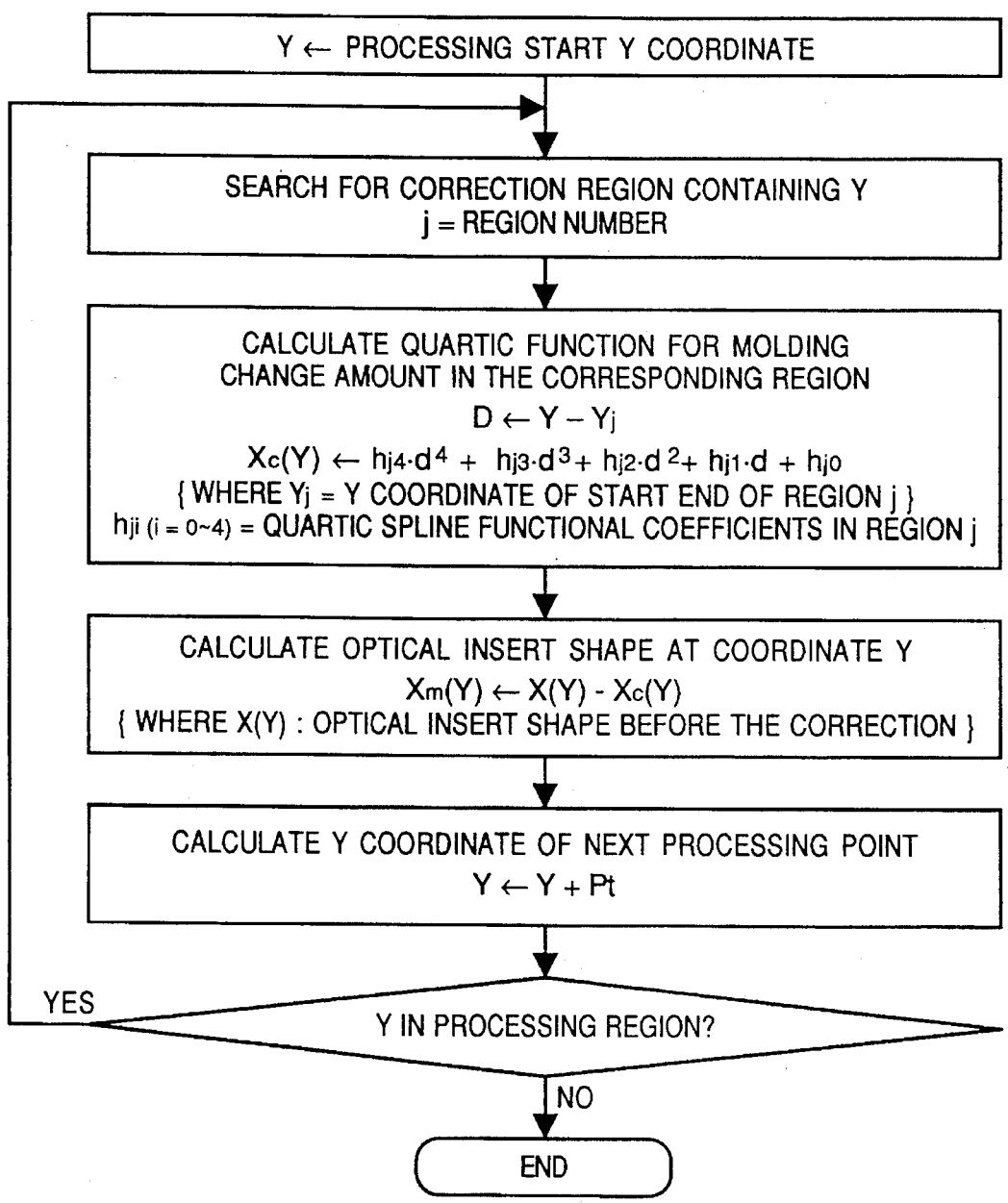
FIG. 10 is a flow chart showing the procedure of calculating optical insert processing data.

Assuming that the data pitch in the direction of the generatrix, which is required in the optical insert processing, is Pt, the shape processing data of the optical insert is calculated in accordance with a flow chart as illustrated in FIG. 10.

(8) Correction of directrix radius

The changes from the shape of the optical insert caused by molding also appear in changes in directrix radius.

Since the regions are wide and the design shape is complicated along the generatrix, molding errors also bring about complicated changes. However, the width of the directrix section is small, and its shape is a circular arc, so it is safe to consider that the correction is to be simply performed for a change in radius. That is, assuming that the directrix radius is r' with respect to a directrix radius r (=design value) of the optical insert, the molding change in the directrix radius has change rate k=r'/r. In the correction, therefore, the optical insert is processed to meet the following equation:

$$r(Y)=r/k$$

Consequently, the directrix radius of the molded product agrees with the directrix radius of the design value.

Generally, however, the change rate k of the directrix radius differs from one position to another along the generatrix. Therefore, a molding method for obtaining substantially the same change rate of the directrix radius throughout the entire generatrix requires complicated control, and the tact time of the method is long and unstable, resulting in an increased manufacturing cost.

This embodiment has solved this problem by performing the functional approximation by changing the correction amount of the change in directrix radius in accordance with the position along the generatrix.

That is, the directrix radius is measured at a plurality of points throughout the entire generatrix, and the change rate of the directrix radius at each point is calculated.

Subsequently, the generatrix position and the change rate of the directrix radius are functionally approximated by using a spline function as in the case of the generatrix. In this case, however, a spline function using a general cubic expression can be used since the approximate function is not an expression representing the surface shape.

(9) Correction processing for optical insert

In the step of correction-processing the optical insert, while the correction amount obtained by the above correction calculation is taken into consideration, processing point coordinates are calculated for each partial region from the following equation:

$$X_m(Y)=X(Y)-X_c(Y)$$

by taking account of the shape of the processing tool, thereby forming corrected optical insert data. In the above equation, $X_m(Y)$ is the optical insert shape design value calculated by subtracting a correction amount $X_c(Y)$ from an optical insert shape $X(Y)$ before the correction, i.e., the value obtained by taking the correction amount into account.

Figure 11:
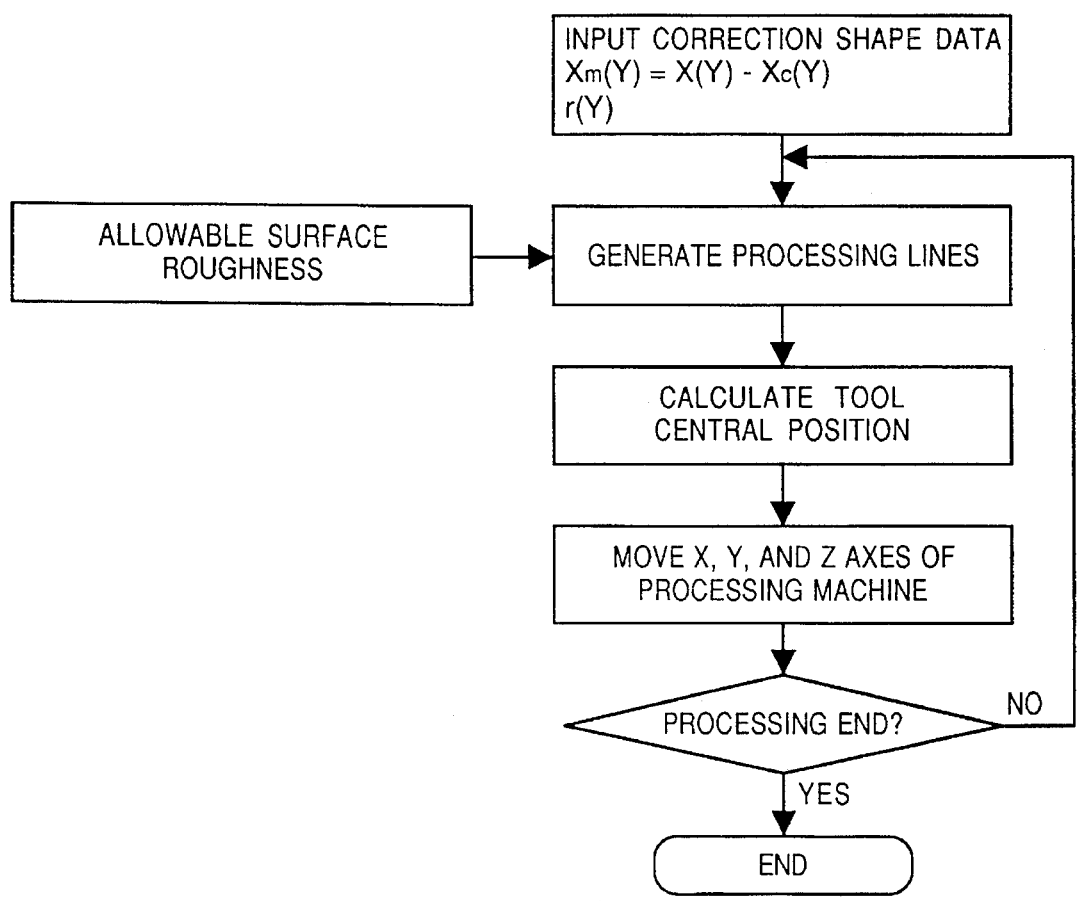
FIG. 11 is a flow chart for correction processing.

The optical insert corrected shape is processed in accordance with the flow chart shown in FIG. 11 by using the NC processing machine illustrated in FIG. 5.

Figure 12:
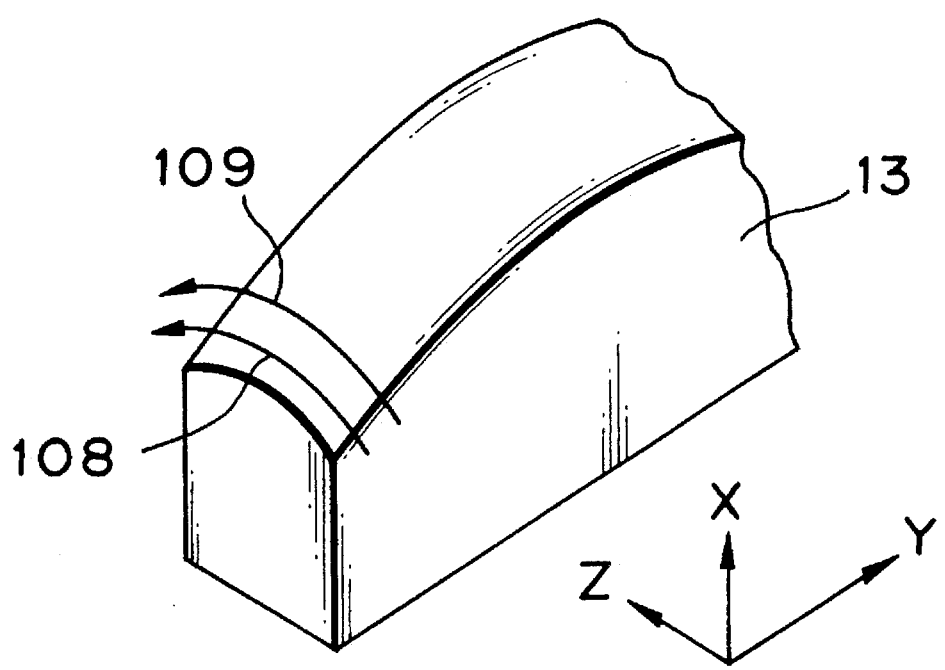
FIG. 12 is a perspective view showing a method of processing An optical insert for an elongated lens.

More specifically, in the formation and processing of processing data, processing lines obtained by dividing a section, which has $X_m(Y)$ as the peak and is perpendicular to $X_m(Y)$, in the Y direction are determined (108, 109, ... in FIG. 12). The interval of these processing lines is so determined that the surface roughness in the Y direction falls within an allowable range (generally, 0.05 μm or less).

First, a line (e.g., 108 in FIG. 12) at the start position of processing is processed. This shape is determined in accordance with (7) Calculation of optical insert processing data and (8) Correction of directrix radius mentioned earlier.

Figure 13A:
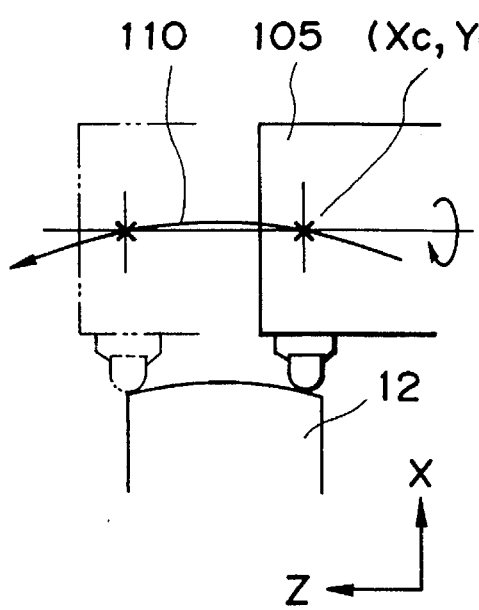
FIGS. 13A and 13B are views showing the locus of a tool when an optical insert is processed.
Figure 13B:
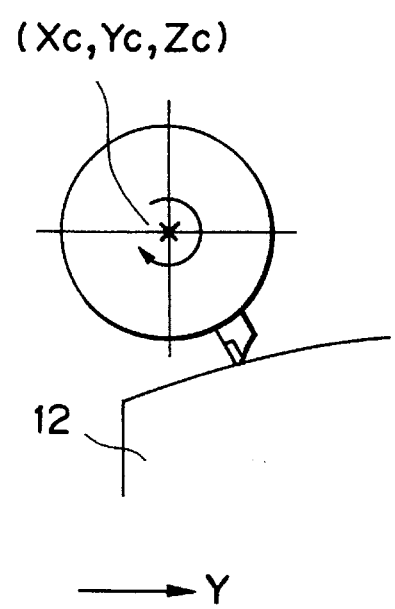

A tool central position $(X_c, Y_c, Z_c)$ shown in FIGS. 13A and 13B is continuously calculated such that the tip of the tool traces the first line. In addition, the X, Y, and Z axes of the processing machine are so moved that the center of the tool traces a tool central locus 110 of $(X_c, Y_c, Z_c)$.

When the first line is completely processed in this fashion, processing for the next line (e.g., 109 in FIG. 12) is started.

When the above routine is repeatedly executed to completely process all the lines divided along the Y direction as mentioned earlier, processing for the entire surface ends. In this way, the optical insert having the corrected shape $X_m(Y)$ as the generatrix and $r(Y)$ as the directrix can be processed.

(10) Molding

The lens of this embodiment was molded under the conditions in the initial molding step mentioned earlier by using the optical insert corrected as described above.

(11) Measurement for optical surface shape of molded product

Figure 14:
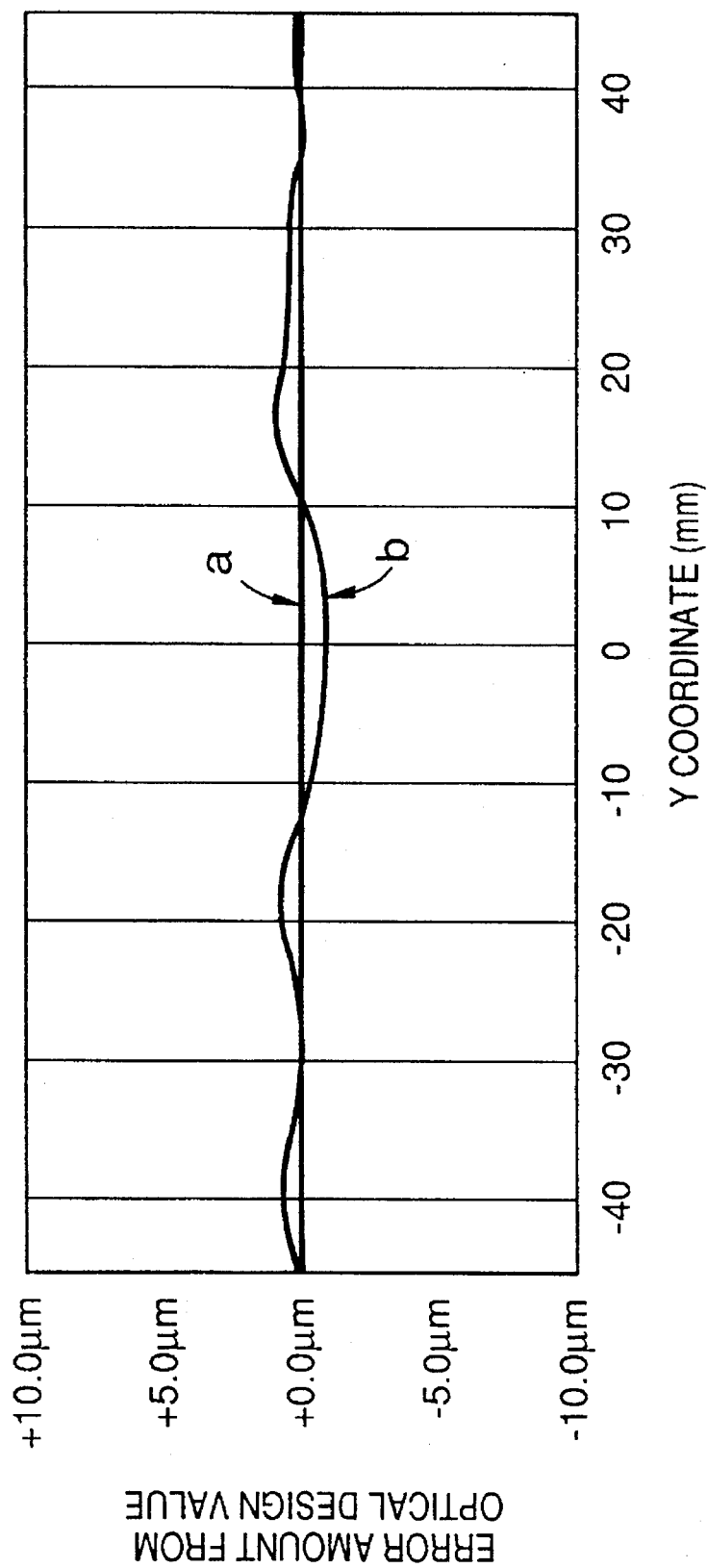
FIG. 14 is a graph showing the error amount of the optical surface shape of a molded product from the design shape after correction.

In the step of measuring the optical surface shape of the molded product, the shape of the optical surface of the molded product was measured in the same manner as in (4). FIG. 14 shows the results of the measurement. As is apparent from FIG. 14, a very good molded product could be manufactured. According to FIG. 14, the error amount $(E_i)$ between a design shape a and a molded product optical surface shape b is smaller than the preset design tolerance (±2 μm), and this means that the molding of the optical element is completed at this point. If the error amount $(E_i)$ is larger than the design tolerance, the correction value is again calculated by the correction calculation to perform the correction processing for the optical insert, thereby molding the optical element.

(Other embodiments)

In the above embodiment, an optical element is molded on the basis of the optical design shape in the initial manufacture of the optical insert. However, it is also possible to calculate the degrees of shrinkage deformation in individual portions of a molded product by performing, e.g., fluidization, dwell, cooling analysis, thermal stress analysis, or structural analysis, and to manufacture the optical insert by taking the consequent error amount into consideration. In this case, a molded product having an optical design shape can be formed at once without performing initial molding. Molding can also be performed by using an optical insert formed by taking account of only an even shrinkage (e.g., a shrinkage factor 0.4 to 0.5%) of an element as in conventional methods. In this case, it is only necessary to perform partial fine adjustment when another optical insert is manufactured.

In each of the embodiments as described above, a lens with a high accuracy can be molded by the use of the optical insert subjected to the correction processing.

Note that the present invention is also applicable to changes and modifications of the above embodiments without departing from the gist of the invention.

For example, the approximation is performed by using a quartic function in the correction calculation in the above embodiments. It is also possible to perform the approximation by using another function (e.g., a Gaussian function or a trigonometric function) depending on the habits of a molded product. In addition, the optical design is possible by using a spline function or the like as well as the polynomial approximation.

Each of the above embodiments has been described by taking the toric lens as an example. The present invention, however, can also be applied to asymmetrical shrinkage or deformation of an axially symmetrical lens, and to partial shrinkage or deformation of a lens, such as a mirror or a prism, whose optical surface is flat. It is also possible to mold a flat surface by using an optical insert which is not flat.

The material is also not limited to an acrylic (PMMA) resin but may be another optical resin (e.g., a polycarbonate-based resin, an olefin-based resin, a norbornane-based resin, a styrene-based resin, a copolymer of any of these resins, or a blended resin).

According to the embodiments of the present invention as discussed above, the shape of the optical surface is divided into a plurality of regions and approximated by a function, and the optical insert is processed into a shape by which the shape errors of an optical element are canceled. This makes it possible to effectively correct local shrinkage and deformation occurring when the optical element is molded.

The present invention is not limited to the above embodiments and various changes and modifications can be made within the spirit and scope of the present invention. Therefore, to apprise the public of the scope of the present invention the following claims are made.

What is claimed is:

1. An optical element molding method of molding a material of an optical element by using an optical insert member, thereby transferring a shape of a surface, as an optical function surface, of a cavity surface of the optical insert member onto a surface of the material of the optical element, comprising:

the first step of setting molding conditions before molding of the optical element, such that a constant shape error is stably formed on a surface, as a transferred optical function surface, of the optical element;

the second step of molding a sample optical element under the molding conditions determined at said first step to form the transferred optical function surface on the sample optical element;

the third step of dividing the transferred optical function surface of the sample optical element into a plurality of regions, and approximating shape errors of the regions by using functions so that the functions are continuous in boundaries between the regions;

the fourth step of processing the shape of the cavity surface of the optical insert member into a shape by which the constant shape error is cancelled, on the basis of the functions used in said third step; and the fifth step of molding the optical element by using the optical insert member processed in said fourth step, wherein said third step further comprises the error measurement step of measuring the shape error of the sample optical element, and, in said error measurement step, in order to correct a setting error of the sample optical element, the sample optical element is rotated a very small amount about an optical axis and displaced a very small amount in a predetermined direction, thereby adjusting a position of the sample optical element.

2. The method according to claim 1, wherein in said third step, the functions are expressed by quartic functions obtained by approximating differential values of shape errors in the divided regions by cubic functions and integrating the cubic functions.

3. The method according to claim 1, wherein the position adjustment for the sample optical element is so performed that a square sum of errors between a shape of the sample optical element and a design shape is minimized.

* * * * *

UNITED STATES PATENT AND TRADEMARK OFFICE
CERTIFICATE OF CORRECTION

PATENT NO. : 5,549,855
DATED : August 27, 1996
INVENTOR(S) : HIROSHI NAKANISHI, ET AL.

It is certified that error appears in the above-indentified patent and that said Letters Patent is hereby corrected as shown below:

Title page, item [57],
　　line 14, "optical-" should read --optical--.

Column 1,
　　line 35, "element" should read --element is--.

Column 2,
　　line 38, "over" should read --over---.

Column 4,
　　line 5, "Scope" should read --scope--;
　　line 24, "An" should read --an--;
　　line 33, "An" should read --an--; and
　　line 40, "An" should read --an--.

Column 5,
　　line 40, "8)," should read --$\theta$),--.

Column 6,
　　line 61, "Calculated" should read --calculated--.

UNITED STATES PATENT AND TRADEMARK OFFICE
CERTIFICATE OF CORRECTION

PATENT NO. : 5,549,855
DATED : August 27, 1996
INVENTOR(S) : HIROSHI NAKANISHI, ET AL.

It is certified that error appears in the above-indentified patent and that said Letters Patent is hereby corrected as shown below:

Column 7,
　　line 8, "8" should read --θ--.

Signed and Sealed this

Eighteenth Day of February, 1997

Attest:

BRUCE LEHMAN

Attesting Officer　　Commissioner of Patents and Trademarks